(12) United States Patent
Zuck

(10) Patent No.: US 7,051,755 B2
(45) Date of Patent: May 30, 2006

(54) ADJUSTABLE PRESSURE REGULATOR

(75) Inventor: James C. Zuck, Marshall, MI (US)

(73) Assignee: Marshall Excelsior Company, Marshall, MI (US)

( * ) Notice: Subject to any disclaimer, the term of this patent is extended or adjusted under 35 U.S.C. 154(b) by 146 days.

(21) Appl. No.: 10/411,563

(22) Filed: Apr. 10, 2003

(65) Prior Publication Data

US 2004/0200531 A1    Oct. 14, 2004

(51) Int. Cl.
 *G05D 16/02* (2006.01)
(52) U.S. Cl. .................... 137/338; 137/505.25
(58) Field of Classification Search ........... 137/505.25, 137/505.28, 338
 See application file for complete search history.

(56) References Cited

U.S. PATENT DOCUMENTS

| | | | | |
|---|---|---|---|---|
| 614,441 | A | * | 11/1898 | Burnett, Jr. ............ 137/505.25 |
| 2,258,595 | A | * | 10/1941 | Butler ..................... 137/338 |
| 2,745,727 | A | * | 5/1956 | Holzapfel .............. 137/505.12 |
| 2,752,758 | A | * | 7/1956 | Tann ...................... 137/505.12 |
| 2,917,073 | A | * | 12/1959 | Dinkelkamp ............. 137/495 |
| 3,548,862 | A | * | 12/1970 | Nakamura et al. ..... 137/505.12 |
| 3,848,631 | A | * | 11/1974 | Fallon .................... 137/505.11 |
| 4,181,139 | A | * | 1/1980 | Martini .................. 137/505.25 |
| 4,194,522 | A | | 3/1980 | Lucas et al. |
| 5,669,369 | A | * | 9/1997 | Scott ..................... 137/505.25 |
| 5,890,508 | A | | 4/1999 | Powell |
| 6,056,006 | A | | 5/2000 | Hagerty |

FOREIGN PATENT DOCUMENTS

DE    1966571    6/1973

* cited by examiner

*Primary Examiner*—Stephen M. Hepperle
(74) *Attorney, Agent, or Firm*—Varnum Riddering

(57) ABSTRACT

An adjustable floating seal piston type pressure regulator valve of the type wherein a spring biased piston engages a floating seal in a regulator body valve chamber to open and close a valve seat outlet in the valve chamber. The valve seat comprises a separate member from the regulator body and is adjustably movable in the valve chamber toward and away from the piston, such that movement of the valve seat toward the piston serves to lower a regulated outlet pressure and movement of the valve seat away from the piston serves to increase the regulated outlet pressure. The valve seat member is moved by an adjustment screw that is externally accessible by an adjustment tool. A tubular expansion chamber surrounds the regulator body and provides an enlarged expansion chamber that reduces valve recycle time. Convolutions or ribs in the expansion chamber housing enhance heat through transfer to the valve gases.

5 Claims, 1 Drawing Sheet

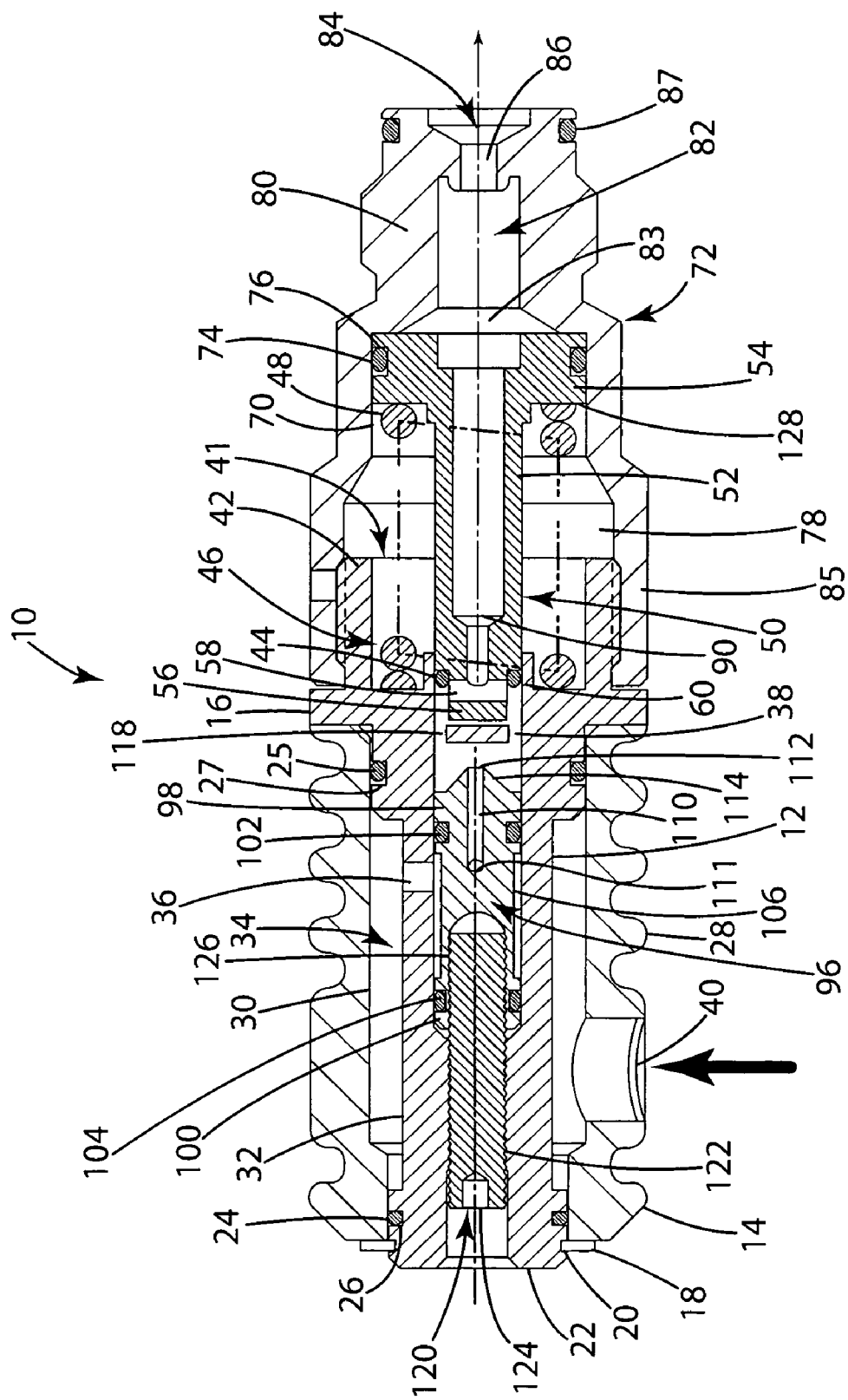

ADJUSTABLE PRESSURE REGULATOR

BACKGROUND OF THE INVENTION

The present invention relates to fluid flow pressure regulators and more particularly to an easily adjustable secondary pressure regulator having an expansion chamber that improves recycle time.

Fluid flow pressure regulators are used for a number of purposes. Pressure regulators include primary pressure regulators and secondary pressure regulators. These can be used for a number of gases, including carbon dioxide ($CO_2$). One such use for such pressure regulators is for gas-powered weapons, such as paintball guns. A primary regulator typically is not adjustable and reduces line pressure from about 3500 or 4800 psi to 500–800 psi. A secondary regulator may be adjustable and reduces pressure from 500–800 psi to any one of a number of operating ranges, such as 150–250 psi, 250–350 psi, and 350–450 psi. A different model of secondary pressure regulator may be used for each secondary pressure range.

Adjustable pressure regulators are known. An adjustable pressure regulator employing replaceable floating valve seals of different thicknesses is shown in U.S. Pat. No. 6,056,006, the disclosure of which is incorporated by reference. Floating valve seals are desirable because they tend to seat on a valve seat without skewing. Replacement of seals to achieve adjustment, however, can be inconvenient.

An object of the present invention is to provide an improved pressure regulator of the floating seal or floating "chip" design wherein the output pressure can be varied without replacing the floating seal.

Another object of the present invention is to provide a compact secondary pressure regulator employing an expansion chamber that can be precharged and reduces cycle time.

SUMMARY OF THE INVENTION

The present invention comprises an improvement in a floating seal piston type pressure regulator valve wherein a spring biased piston reciprocates in a valve chamber of a regulator body to open and close a valve opening in a valve seat in the valve chamber by means of a floating seal positioned between the piston and the valve seat. In the present invention, the valve seat comprises a separate member from the regulator body and is adjustably movable in the valve chamber toward and away from the piston, such that movement of the valve seat toward the piston serves to lower a regulated outlet pressure and movement of the valve seat away from the piston serves to increase the regulated outlet pressure.

The regulator body includes a regulator body inlet in fluid communication with the valve chamber. The movable valve seat has a valve seat inlet in communication with the regulator body inlet and a valve seat outlet that is in communication with a regulator body outlet when the valve seat outlet is open. The regulator body inlet is isolated from the regulator body outlet when the valve seat outlet is closed by the piston pressing the floating valve seal over the valve seat outlet. The valve seat member thus isolates the valve chamber inlet from the valve chamber outlet except to the extent that communication is provided through the valve seat outlet.

The valve seat member can be drivingly connected to a threaded adjustment screw rotatably mounted in the valve body, such that rotation of the adjustment screw moves the valve seat toward or away from the piston and floating seal. Desirably, the valve seat member is aligned with the piston and is axially movable with respect thereto, the adjustment screw being axially aligned with the piston and connected between the valve seat member and valve body such that rotation of the adjustment screw moves the valve seat in an axial direction with respect to the valve body. The adjustment screw has an externally accessible connector for the attachment of a rotation tool thereto.

Another feature of the invention is that the regulator further comprises an expansion chamber housing surrounding the valve body that provides an enlarged interior expansion chamber. The expansion chamber has an inlet in communication with a source of pressurized fluid and has an outlet in communication with the valve chamber in the valve body. The expansion chamber serves to precharge the pressure regulator and reduce recycle time. Desirably, the valve body has an elongated cylindrical shape, and the expansion chamber housing comprises a tubular member that fits over the body, with the expansion chamber comprising an annular cavity between the expansion chamber housing and the valve body.

As another feature of the invention, the expansion chamber housing comprises a plurality of spaced annular ribs or convolutions on an outer surface thereof, the ribs enhancing heat transfer to the expansion chamber through the exterior of the expansion chamber housing.

These and other features and advantages of the present invention will hereinafter appear and for purposes of illustration but not of limitation, a preferred embodiment of the present invention is described below and shown in the appended drawings.

BRIEF DESCRIPTION OF THE DRAWING

The drawing FIGURE is a longitudinal section view of a pressure regulator of the present invention.

DETAILED DESCRIPTION OF PREFERRED EMBODIMENTS

Referring to the drawings, pressure regulator 10 includes regulator body 12 mounted in expansion chamber housing 14 that surrounds the body on one side of an outwardly extending radial flange 16. An external retaining ring 18 fits in a groove 20 in end 22 of regulator body 12 and holds the expansion chamber housing 14 on the body between the retaining ring and flange 16. A lower housing seal 24 that fits in a groove 26 adjacent rear end 22 of the regulator body housing is positioned between regulator body 12 and expansion chamber housing 14 and restrains pressure leakage through the end of the expansion chamber housing. An upper housing seal 25 at the other end of the body 12 fits in groove 27 and prevents fluid leakage from the other end of the expansion chamber housing. Regulator body 12 can have a ribbed outer surface 28 that serves as a hand grip and provides increased external surface for thermal transfer.

Expansion chamber housing 14 has a cylindrical interior surface 30 that is spaced outwardly from outer wall 32 of regulator body 12 so as to provide an annular expansion chamber 34 around the exterior of the regulator body. An opening 36 extends between the expansion chamber 34 and a cylindrical interior opening that forms a valve chamber 38 in the interior of regulator body 12. A valve inlet 40 provides an opening from the exterior of the expansion chamber housing 14 into communication with expansion chamber 34.

An outlet end 41 of regulator body 12 includes an annular flange 42 extending outwardly from radial flange 16. A smaller diameter annular flange 44 extends outwardly from an outlet end of cylindrical valve chamber opening 38.

A recessed groove 46 is positioned between flanges 42 and 44, and a coil compression spring 48 is mounted in the groove and extends axially outwardly therefrom.

A piston 50 having an inner portion 52 of narrower diameter and an outer portion 54 of larger diameter is positioned in axial alignment with valve chamber 38, with the inner portion 52 of the piston being mounted slidably in an open end of the valve chamber. The interior of the valve chamber thus serves as a cylinder wall for inner piston 52. The distal end 56 of inner piston 52 is of smaller diameter than piston 52 and includes an inlet opening 58 therein. An O-ring seal 60 surrounds distal end 56 at a position behind opening 58 and resists gas leaks from the valve chamber between piston 52 and the wall of valve chamber 38.

The outer portion 54 of piston 50 engages an interior cylinder wall 70 of bonnet 72 and is axially movable therein. A low pressure O-ring piston seal 74 positioned in a groove 76 in outer piston 54 prevents gas leaks from an interior chamber 78 (between piston 52 and the interior of bonnet 72).

An outer end portion 80 of bonnet 72 includes a opening 82 having an enlarged end 83 adjacent piston 50 that extends to a valve outlet 84 through a reduced diameter neck 86. An annular inner end 85 of bonnet 72 is threaded or otherwise attached on the exterior of annular flange 42. A bonnet nose seal 87 seals the end of the regulator valve in the paintball gun or other appliance in which it is mounted.

Pressurized gas flows through the pressure regulator 10 in a direction from valve inlet 40 to valve outlet 84, with pressurized gas typically being introduced into valve inlet 40 at approximately 500–800 psi and typically exiting from valve outlet 84 at between 150 and 450 psi. Gas flows from inlet 40 through expansion chamber 34 then through opening 36 into valve chamber 38. Gas then flows through a valve seat 96 to opening 58, which leads to an interior opening 90 in piston 50. Piston opening 90 leads to bonnet opening 82 and valve outlet 84.

Pressure is controlled by the pressure regulator by means of generally cylindrical valve seat 96 mounted in generally cylindrical valve chamber 38. Valve seat 96 includes a front end 98 and a rear end 100 that extend to the surface of valve chamber 38, with O-rings 102 and 104 in ends 98 and 100 restricting gas passage thereby. A recessed interior portion 106 of valve seat 96 is in communication with inlet port 36 from the expansion chamber. A valve outlet conduit 110 extends from an inlet opening 111 in communication with recessed portion 106 to an outlet opening 112 in a conically tapered end 114 of valve seat 96. Gas from the expansion chamber thus passes through port 36 into outlet opening 111 in the valve seat and then out through the outlet 112 in end 114 of the opening.

A floating valve seal or "chip" 118 fits in the valve chamber so as to be axially movable therein and is positioned between the distal end 56 of piston 50 and tapered outer end 114 of valve seat 96. The seal 118 has a generally square or triangular axial cross sectional shape or other shape that provides a gas passage between the outer periphery of the seal and the wall of the valve chamber.

The secondary gas pressure at valve outlet 84 is a function of the distance between valve seal chip 118 and end 114 of the valve seat. The reason for this is as follows: when valve inlet 40 is connected to a source of pressurized gas, such as $CO_2$ (typically in the range of 500–800 psi) and when valve outlet 84 is closed (as when an attached paintball gun is not being fired) pressure equalizes within the interior of the valve body until the force exerted by the gas pressure in chamber 83 on the end of enlarged outer portion 54 of piston 50 exceeds the force exerted by the pressure of the gas on the small end 56 of the piston plus the outward force exerted by spring 48 on the inner side 128 of outer piston 54. When the force exerted by the pressure in chamber 83 on the outer end of piston 54 exceeds the sum of the spring pressure and the pressure on the smaller end of piston 52, piston 50 is moved to the left until valve seal 118 is pressed against opening 112 in tapered outlet 114. This blocks any further gas movement through the valve into chamber 82 and thus limits the pressure in that chamber to the pressure existing at the time that the valve seal 118 closes opening 112 in the valve seat. Since the pressure of spring 48 (which is a compression spring) increases with increased compression, it can be seen that an increase in the distance between the valve seal 118 and the end 114 of the valve seat requires greater spring compression in order to close the valve and thus provides a higher secondary pressure in the outlet end of the pressure regulator.

The adjustable regulator shown in U.S. Pat. No. 6,056,006 achieves a variable secondary valve outlet pressure by changing the floating valve seal. A thicker seal results in a lower valve outlet pressure, whereas a thinner seal results in a higher valve outlet pressure.

In the present invention, a single purpose valve seal 118 can be used and pressure regulation can still be achieved by the use of a novel, movable valve seat 96. Valve seat 96, as stated above, is mounted in valve chamber 38 for axial movement toward and away from valve seal 118. The valve seat is movable in the valve chamber by means of an adjustment screw 120 that is received in a threaded opening 122 in end 22 of the regulator body 12.

Adjustment screw 120 has an inner end 126 that is received in a threaded opening in the outer end of valve seat 96. The adjustment screw 120 is threaded securely into the valve seat 96, such that the valve seat rotates with rotation of the adjustment screw 120. Rotation of adjustment screw 120 in the valve seat thus moves the valve seat 96 toward or away from valve seal 118, depending on the direction of rotation by the adjustment screw. The adjustment screw can be rotated by a conventional hex wrench through a hex wrench socket 124 at an outer end of the adjustment screw.

By rotating the adjustment screw, the end 114 of the valve seat 96 can be adjusted toward and away from the valve seat 118 and the end 56 of piston 50 to alter the output pressure of the regulator. This adjustment screw makes it possible to adjust the pressure of the secondary pressure regulator easily with a conventional hex wrench or the like and does not require disassembly of the pressure regulator to replace the valve seat chip with a chip of different thickness.

Another feature of the present invention is the incorporation of a relatively large but compact expansion chamber 34 around regulator body 12. This large expansion chamber provides about three times the volume of gas as a conventional regulator and permits the pressure regulator to be pre-charged before a discharge of the pressure regulator. In a paintball gun application, for instance, when a conventional pressure regulator is used, there can be as much as a 50 psi pressure drop each time the gun is shot and there is a significant time lag for pressure to build up in the pressure regulator before a full charge of the pressure is available for a second shot. In the present invention, when a paintball gun is discharged, there is only about a 10 psi pressure drop during continuous firing, and the regulator is almost instantly recharged when firing is stopped.

Another feature of the present invention is that the ribbed outer surfaces 28 of the expansion chamber housing serve as heat sink, allowing the $CO_2$ gas (which is very cold) to warm up more readily. As the gas becomes warmer, this creates more gas pressure. The extra surface area provided by convolutions 28 increases the gas pressure in the expansion chamber due to the warming of the cold $CO_2$ gas in the interior of the expansion chamber.

It should be recognized that the foregoing is merely exemplary of the preferred practice of the present invention and that various changes in the arrangements and details of construction of the embodiments disclosed herein may be made without departing from the spirit and scope of the present invention.

I claim:

1. In a floating seal piston type pressure regulator valve wherein a spring biased piston reciprocates in a valve chamber of a regulator valve body to open and close a valve opening in a valve seat in the valve chamber by means of a floating seal positioned between the piston and the valve seat, the improvement wherein the valve seat comprises a separate member from the regulator valve body and is adjustably movable in the valve chamber toward and away from the piston, such that movement of the valve seat toward the piston serves to lower a regulated outlet pressure and movement of the valve seat away from the piston serves to increase the regulated outlet pressure, and wherein the regulator further comprises an expansion chamber housing surrounding the regulator valve body that provides an enlarged interior expansion chamber, the expansion chamber having an inlet in communication with a source of pressurized fluid and having an outlet in communication with the valve chamber in the regulator valve body, the expansion chamber serving to precharge the pressure regulator and reduce recycle time, and the expansion chamber housing comprising a plurality of spaced annular ribs on an outer surface thereof, the ribs enhancing heat transfer to the expansion chamber through the exterior of the expansion chamber housing.

2. A floating seal piston type pressure regulator valve wherein a spring biased piston reciprocates in a valve chamber of a regulator valve body to open and close a valve opening in a valve seat in the valve chamber by means of a floating seal positioned between the piston and the valve seat, the valve seat comprising a separate member from the regulator valve body and is adjustably movable in the valve chamber toward and away from the piston, such that movement of the valve seat toward the piston serves to lower a regulated outlet pressure and movement of the valve seat away from the piston serves to increase the regulated outlet pressure, the regulator further comprising an expansion chamber housing surrounding the regulator valve body that provides an enlarged interior expansion chamber, the expansion chamber having an inlet in communication with a source of pressurized fluid and having an outlet in communication with the valve chamber in the regulator valve body, the expansion chamber serving to precharge the pressure regulator and reduce recycle time, the expansion chamber housing being heat conductive and having an outer surface thereof that is formed so as to enhance heat transfer to the expansion chamber through the exterior of the expansion chamber housing.

3. A floating seal piston type pressure regulator valve according to claim 2, wherein the exterior surface of the expansion chamber housing includes a plurality of convolutions that enhance heat transfer.

4. A floating seal piston type pressure regulator valve as in claim 2 wherein the outer surface of the expansion chamber housing comprises a plurality of spaced ribs that serve to enhance heat transfer to the expansion chamber through the exterior of the expansion chamber housing.

5. A floating seal piston type pressure regulator as in claim 2 wherein the valve body is an elongated annular member and the expansion chamber housing is an enlarged annular member that fits over the valve body, with the expansion chamber being positioned between the interior of the expansion chamber body and the exterior of the valve body.

* * * * *